(12) United States Patent
Lee et al.

(10) Patent No.: US 6,241,793 B1
(45) Date of Patent: Jun. 5, 2001

(54) COLD TRAP EQUIPPED WITH CURVILINEAR COOLING PLATE

(75) Inventors: Jui-Hsiung Lee, Feng-San; Kuo-Hsien Yen, Hsin-Chu, both of (TW)

(73) Assignee: Taiwan Semiconductor Manufacturing Company, Ltd, Hsin Chu (TW)

( * ) Notice: Subject to any disclaimer, the term of this patent is extended or adjusted under 35 U.S.C. 154(b) by 0 days.

(21) Appl. No.: 09/366,613

(22) Filed: Aug. 2, 1999

(51) Int. Cl.[7] ........................................................ B01D 8/00
(52) U.S. Cl. ............................... 55/434.2; 55/DIG. 15; 62/55.5
(58) Field of Search ........................... 55/434.2, DIG. 15; 96/FOR 163; 62/55.5

(56) References Cited

U.S. PATENT DOCUMENTS 3,472,039 * 10/1969 Hait ........................................ 62/55.5
4,785,638 * 11/1988 Viscuso ................................. 62/55.5

* cited by examiner

Primary Examiner—Duane Smith
Assistant Examiner—Robert A. Hopkins
(74) Attorney, Agent, or Firm—Tung & Associates

(57) ABSTRACT

A cold trap that is equipped with a curvilinear housing and a curvilinear cooling plate contained therein for collecting unwanted reactant gases and reaction byproducts in an exhaust gas is disclosed. In the curvilinear housing of the cold trap, a curvilinear cooling plate, i.e., in a convex shape is provided which has a plurality of cooling fins mounted on a convex surface facing an incoming flow of exhaust gas such that contaminating powder in the exhaust gas is collected by the cooling fins. The present invention novel curvilinear cooling plate functions at twice the efficiency of a conventional flat cooling plate such that the frequency for cleaning required for the present invention novel cold trap is reduced.

20 Claims, 1 Drawing Sheet

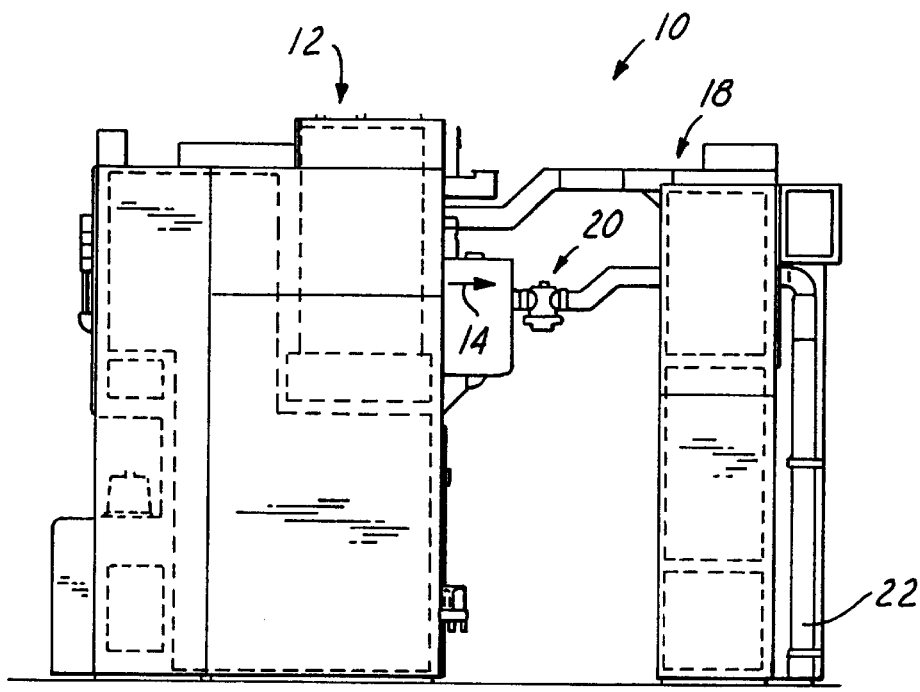
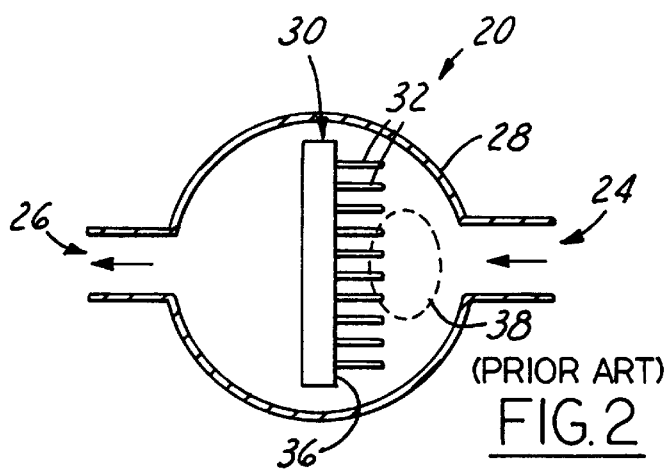
(PRIOR ART)
FIG. 1
(PRIOR ART)
FIG. 2
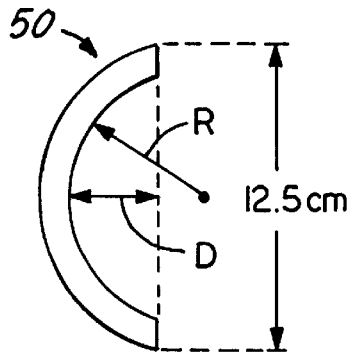
FIG. 3A
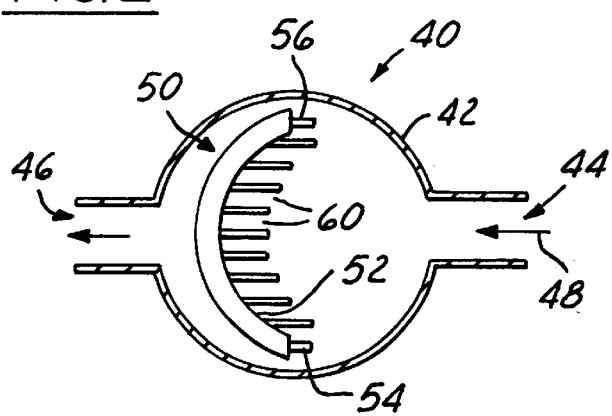
FIG. 3

COLD TRAP EQUIPPED WITH CURVILINEAR COOLING PLATE

FIELD OF THE INVENTION

The present invention generally relates to a cold trap used in a semiconductor manufacturing process for trapping reaction byproducts in a furnace exhaust, and more particularly, relates to a cold trap that is equipped with a curvilinear cooling plate with cooling fins for trapping reaction byproducts and unreacted gases in a furnace exhaust during a silicon nitride deposition process.

BACKGROUND OF THE INVENTION

Silicon nitride has been an important material in various semiconductor applications. For instance, silicon nitride has been used as a mask against oxygen diffusion during a local oxidation (LOCOS) process; as a passivation layer for its superior barrier property to contaminants; as a gate dielectric layer in memory devices; and as an interlevel dielectric layer in an oxide-nitride-oxide (ONO) stacked-gate structure. Silicon nitride also has superior barrier properties against metal ions and moisture.

Silicon nitride has been widely used as a passivation layer for protecting a semiconductor component. Silicon nitride can be formed by either a LPCVD or PECVD technique. The LPCVD technique, where dichlorosilane is used as the reactant gas, can be carried out in a hot-wall LPCVD system, such as in a vertical furnace. The chemical reaction can be described as follows:

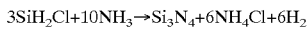

$$3SiH_2Cl_2 + 10NH_3 \rightarrow Si_3N_4 + 6NH_4Cl + 6H_2$$

The hot-wall LPCVD system is normally carried out at a temperature between about 750°~800° C. and the chamber pressure is kept at several hundred m Torr. A layer of stoichiometric silicon nitride can thus be deposited on a wafer surface. A typical deposition equipment utilizing a vertical furnace is shown in FIG. 1.

During a vertical furnace silicon nitride deposition process, as described by the above mechanism for the chemical reaction, a reaction by-product such as ammonium chloride ($NH_4Cl$) in the form of a fine powder can easily deposit on any cold surface in the furnace or in the ducting system for the furnace. The ammonium chloride powder must be captured by a cold trap such that it does not form on the inner walls of the ducting system or in the furnace presenting a serious contamination source. For instance, fine powder in the ducts may be syphoned back into the furnace during a deposition process if the pressure in the furnace is not carefully controlled. The capture efficiency of the cold trap for the ammonium chloride fine powder is therefore an important factor in the successful deposition of silicon nitride films in a furnace technique.

As shown in FIG. 1, a vertical furnace unit 12 is the heart of a silicon nitride deposition system 10. During the deposition of a silicon nitride film on a plurality of wafers positioned in the vertical furnace, the furnace exhaust gas 14 which contains unreacted reactant gases such as dichlorsilane, ammonium and reaction byproduct ammonium chloride powder is sent through a cold trap 20 before it enters into a gas treatment unit 18 and be released into a factory exhaust system 22. The capture of substantially all the ammonium chloride fine powder in a cold trap 20 is therefore an important step in a successful exhaust gas treatment process for depositing silicon nitride.

A cross-sectional view of a conventional cold trap 20 complete with an inlet 24 and an outlet 26 is shown in FIG. 2. The cold trap 20 is normally constructed of a curvilinear housing 28 which supports a cooling plate 30 therein. The cooling plate 30 has a flat platen structure with a cavity contained therein for allowing a cooling medium to pass therethrough. A suitable cooling medium can be chilled water, i.e., chilled deionized water or city water at a temperature of about 15° C. The cooling plate 30 is normally constructed in a rectangular shape, i.e., having a dimension of about 4 inch×6 inch and is equipped with a plurality of cooling fins 32 extending from a front surface 36 of the cooling plate 30. The cooling fins 32 are provided to facilitate the evaporation of heat absorbed by the cooling medium in the cavity and furthermore, to provide a cold surface for the deposition of ammonium chloride powder. The cooling plate 30 is further provided with a cooling medium inlet and a cooling medium outlet (both not shown) for the input and output of the cooling medium into and from the cavity.

In the configuration of the cooling plate 30 shown in FIG. 2, the cooling plate and the spherical housing 28 must be frequently cleaned, i.e., by a preventive maintenance cleaning procedure in about every two weeks. Fine particles 38 of ammonium chloride tend to clog the cooling fins 32 and thus blocking the inlet 24 for the exhaust gas. The requirement for frequent cleaning of the cold trap 20 therefore presents a problem in the silicon nitride furnace system in causing down time which reduces the fabrication yield.

It is therefore an object of the present invention to provide a cold trap that can be efficiently used in a semiconductor fabrication process for collecting unwanted particles that does not have the drawbacks or shortcomings of the conventional cold traps.

It is another object of the present invention to provide a cold trap that can be used effectively in a semiconductor material deposition system such that the cleaning frequence required for the cold trap can be reduced.

It is a further object of the present invention to provide a cold trap for use in a semiconductor fabrication process which does not need frequent cleaning.

It is another further object of the present invention to provide a cold trap for use in a semiconductor fabrication process that is equipped with a curvilinear cooling plate.

It is still another object of the present invention to provide a cold trap for use in a semiconductor film deposition system that is equipped with a convex cooling plate equipped with cooling fins extending from the convex surface.

It is yet another object of the present invention to provide a cold trap for use in a vertical furnace silicon nitride film deposition system which is equipped with a curvilinear cooling plate.

It is still another further object of the present invention to provide a cold trap for use in a silicon nitride furnace deposition process that is equipped with a convex cooling plate and cooling fins in the convex surface.

It is yet another further object of the present invention to provide a cold trap for use in a vertical furnace for depositing silicon nitride films wherein the trap has greatly improved efficiency for trapping ammonium chloride fine powder.

SUMMARY OF THE INVENTION

In accordance with the present invention, a cold trap that is equipped with a curvilinear cooling plate having greatly improved trapping efficiency for fine powder is provided.

In a preferred embodiment, a cold trap for collecting unwanted reactants and particles in an exhaust gas is provided which includes a housing of generally curvilinear shape, a gas inlet at a first end of the housing, a gas outlet at a second end of the housing opposite to and in fluid communication with the gas inlet, and a cooling plate equipped with cooling fins in a convex surface of the plate facing the gas inlet, the cooling plate is cooled by a heat-transfer fluid.

In the cold trap for collecting unwanted reactants and particles, the housing may be formed in a spherical shape. The cooling plate may be cooled by a heat-transfer fluid flown through a cavity contained in the cooling plate. The cooling plate may further include a cavity contained therein, a cooling fluid inlet and a cooling fluid outlet. The cooling plate may have a rectangular shape.

In the cold trap for collecting unwanted reactants and particles, the cooling plate may further include a plurality of cooling fins positioned between about 0.2 cm and about 2 cm apart, preferably between about 0.5 cm and about 1.5 cm apart, and more preferably between about 1 cm apart. The cooling plate may have a curvature that has a diameter of at least 12.5 cm. The cooling plate may have a curvature that has a maximum depth at a center point which is about ⅔ of a radius of the curvature.

In another preferred embodiment, a curvilinear cold trap for collecting reaction by-products in a furnace exhaust during a semiconductor fabrication process is provided which includes a curvilinear housing that has an exhaust gas inlet and an exhaust gas outlet situated at two opposite ends of the housing, a convex-shaped cooling plate that is equipped with a plurality of cooling fins on a convex surface in a spaced-apart relationship from each other, and a cooling fluid inlet and a cooling fluid outlet positioned on and in fluid communication with a cavity in the convex-shaped cooling plate.

In the curvilinear cold trap for collecting reaction byproducts, the curvilinear housing may have a spherical shape. The convex-shaped cooling plate being cooled by a heat-transfer fluid flown through a cavity contained in the cooling plate. The convex-shaped cooling plate may have a rectangular shape.

In the curvilinear cold trap for collecting reaction byproducts in a furnace exhaust gas, the plurality of cooling fins are positioned between about 0.2 cm and about 2 cm apart, and preferably between about 0.5 cm and about 1.5 cm apart. The cooling plate may have a curvature that has a diameter of at least 12.5 cm. The cooling plate may also have a curvature that has a maximum depth at a center point which is about ⅔ of a radius of the curvature. The convex-shaped cooling plate may have a rectangular shape with a dimension of about 10 cm×15 cm.

BRIEF DESCRIPTION OF THE DRAWINGS

These and other objects, features and advantages of the present invention will become apparent from the following detailed description and the appended drawings in which:

FIG. 1 is an illustration of a conventional furnace deposition system equipped with a furnace unit, a cold trap and an exhaust gas treatment unit.

FIG. 2 is a cross-sectional view of the cold trap used in the conventional furnace deposition system.

FIG. 3 is a cross-sectional view of the present invention cold trap illustrating a convex-shaped cooling plate.

FIG. 3A is an enlarged, cross-sectional view of the cooling plate of FIG. 3.

DETAILED DESCRIPTION OF THE PREFERRED EMBODIMENT

The present invention discloses a cold trap for use in a semiconductor film deposition system for collecting reaction byproducts in an exhaust gas from a deposition furnace. The present invention cold trap can be used in any furnace exhaust system, but is particularly suitable for use in a silicon nitride furnace deposition system wherein the exhaust gas contains ammonium chloride fine powder that should be collected by an efficient cold trap device.

In the present invention novel cold trap, a housing of generally curvilinear shape is used to contain a cooling plate that is constructed in a convex-shape. The housing further contains a gas inlet at one end of the housing and a gas outlet at a second end of the housing which is opposite to and in fluid communication with the gas inlet. The cooling plate situated in the cavity of the housing is equipped with cooling fins positioned on a convex surface of the plate that faces the gas inlet. The cooling plate is suitably cooled through a cooling fluid inlet and a cooling fluid outlet by a heat transfer cooling fluid.

Referring now to FIG. 3, wherein a present invention cold trap 40 is shown. The cold trap 40 is constructed by a curvilinear housing 42 which may be suitably formed in a spherical shape as shown in FIG. 3. The housing 42 may further be formed in a drum shape that has a circular cross-sectional area. The housing 42 is provided with an exhaust inlet 44 and an exhaust outlet 46. The exhaust gas inlet 44 is connected in fluid communication with a furnace exhaust system for inputting a furnace exhaust gas. The exhaust gas outlet 46 is connected in fluid communication with an exhaust gas treatment system (not shown) such that the exhaust gas after treatment can be released to a factory exhaust system.

Inside the spherical housing 42 (shown in FIG. 3) is a cooling plate 50 which is formed in a convex-shape. The convex surface 52 is provided with a plurality of cooling fins 60 which have base portions integrally connected to the convex surface 52 of the cooling plate 50. The plurality of cooling fins 60 provides the dual functions of evaporating heat and providing a cold surface for depositing a fine powder of reaction byproduct. The cooling plate 50 is further provided with a heat-transfer fluid inlet 54 and a heat-transfer fluid outlet 56 which are used for feeding a heat-transfer fluid through a cavity (not shown) contained in the cooling plate 50. The plurality of cooling fins 60 is positioned facing the exhaust gas 48 which enters the exhaust gas inlet 44 such that substantially all the reaction byproduct powder contained in the exhaust gas 48 is deposited on the cooling fins 60. The present invention novel cooling plate 50 provides a trapping efficiency at least doubles that of the conventional cooling plate shown in FIG. 2. It has been found that, instead of a maximum deposited thickness of 7 $\mu$m on the cooling fins which requires a preventive maintenance cleaning procedure, the present invention novel cooling plate allows the maximum deposition of 14 $\mu$m reaction byproduct before it requires a preventive maintenance cleaning. Furthermore, while the conventional flat cooling plate can only function for approximately two weeks before cleaning, the present invention curvilinear cooling plate allows a continuous use of at least four weeks before a wet cleaning process is necessary.

The cooling fins 60 are positioned on the convex surface 52 at a distance between about 0.2 cm and about 2 cm apart, preferably between about 0.5 cm and about 1.5 cm apart, and more preferably between about 1 cm apart.

FIG. 3A shows an enlarged, cross-sectional view of the cooling plate 50 without showing the cooling fins. The cooling plate 50 is formed with a radius of "R" and a maximum depth of "D" at a center point. The value of "D" is approximately ⅔ of "R". For instance, for a present invention novel cooling plate 50 that has a height of approximately 12.5 cm, the value of "D" is approximately 8.5 cm.

It should be noted that while the dimensions shown in FIG. 3A is suitable for the present invention novel cooling plate, any other dimensions may also be suitable depending on the size and shape of the housing for the cold trap. The materia used for fabricating the housing, the cooling plate and the cooling fins may be suitably a corrosion-resistant metal such as stainless steel. A suitable planar area of the cooling plate 50 may be about 10 cm×15 cm, i.e., in a rectangular (and convex) shape. A suitable heat-transfer fluid used for pumping through the cooling plate 50 may be chilled DI water or city water at a temperature between about 10° C. and about 18° C., and preferably at about 15° C.

The present invention novel apparatus of a curvilinear cold trap containing a curvilinear cooling plate therein has therefore been amply described in the above descriptions and in the appended drawings of FIGS. 3 and 3A.

While the present invention has been described in an illustrative manner, it should be understood that the terminology used is intended to be in a nature of words of description rather than of limitation.

Furthermore, while the present invention has been described in terms of a preferred and alternate embodiment, it is to be appreciated that those skilled in the art will readily apply these teachings to other possible variations of the inventions.

The embodiment of the invention in which an exclusive property or privilege is claimed are defined as follows:

1. A cold trap for collecting unwanted reactants and particles in an exhaust gas comprising:
    a housing of generally curvilinear shape,
    a gas inlet at a first end of said housing,
    a gas outlet at a second end of said housing opposite to and in fluid communication with said gas inlet, and
    a cooling plate equipped with cooling fins on a convex surface of the plate facing said gas inlet, said cooling plate having a curvature with a diameter of at least 12.5 cm and is cooled by a heat-transfer fluid.

2. A cold trap for collecting unwanted reactants and particles in an exhaust gas according to claim 1, wherein said housing has a spherical shape.

3. A cold trap for collecting unwanted reactants and particles in an exhaust gas according to claim 1, wherein said cooling plate is cooled by a heat-transfer fluid flown through a cavity contained in said cooling plate.

4. A cold trap for collecting unwanted reactants and particles in an exhaust gas according to claim 1, wherein said cooling plate further comprises a cavity contained therein, a cooling fluid inlet and a cooling fluid outlet.

5. A cold trap for collecting unwanted reactants and particles in an exhaust gas according to claim 1, wherein said cooling plate further comprises a plurality of cooling fins positioned between about 0.2 cm and about 2 cm apart.

6. A cold trap for collecting unwanted reactants and particles in an exhaust gas according to claim 1, wherein said cooling plate further comprises a plurality of cooling fins positioned preferably between about 0.5 cm and about 1.5 cm apart.

7. A cold trap for collecting unwanted reactants and particles in an exhaust gas according to claim 1, wherein said cooling plate further comprises a plurality of cooling fins positioned preferably about 1 cm apart.

8. A curvilinear cold trap for collecting reaction byproducts in a furnace exhaust during a semiconductor fabrication process comprising:
    a curvilinear housing having an exhaust gas inlet and an exhaust gas outlet situated at two opposite ends of said housing,
    a convex-shaped cooling plate equipped with a plurality of cooling fins on a convex surface in a spaced-apart relationship from each other, said cooling plate having a curvature with a maximum depth at a center point that is about ⅔ of a radius of said curvature, and
    a cooling fluid inlet and a cooling fluid outlet on and in fluid communication with a cavity in said convex-shaped cooling plate.

9. A curvilinear cold trap for collecting reaction by-products in a furnace exhaust in a semiconductor fabrication process according to claim 8, wherein said curvilinear housing has a spherical shape.

10. A curvilinear cold trap for collecting reaction by-products in a furnace exhaust in a semiconductor fabrication process according to claim 8, wherein said convex-shaped cooling plate being cooled by a heat-transfer fluid flown through a cavity contained in said cooling plate.

11. A curvilinear cold trap for collecting reaction by-products in a furnace exhaust in a semiconductor fabrication process according to claim 8, wherein said plurality of cooling fins are positioned between about 0.2 cm and abut 2 cm apart.

12. A curvilinear cold trap for collecting reaction by-products in a furnace exhaust in a semiconductor fabrication process according to claim 8, wherein said plurality of cooling fins are preferably positioned between about 0.5 cm and about 1.5 cm apart.

13. A curvilinear cold trap for collecting reaction by-products in a furnace exhaust in a semiconductor fabrication process according to claim 8, wherein said plurality of cooling fins are more preferably positioned at about 1 cm apart.

14. A cold trap for collecting unwanted reactants and particles in an exhaust gas comprising:
    a housing of generally curvilinear shape,
    a gas inlet at a first end of said housing,
    a gas outlet at a second end of said housing opposite to and in fluid communication with said gas inlet, and
    a cooling plate equipped with cooling fins on a convex surface of the plate facing said gas inlet, said cooling plate having a curvature with a maximum depth at a center point that is about ⅔ of a radius of said curvature.

15. A cold trap for collecting unwanted reactants and particles in an exhaust gas according to claim 14, wherein said housing has a spherical shape.

16. A cold trap for collecting unwanted reactants and particles in an exhaust gas according to claim 14, wherein said cooling plate is cooled by a heat-transfer fluid flown through a cavity contained in said cooling plate.

17. A cold trap for collecting unwanted reactants and particles in an exhaust gas according to claim 14, wherein said cooling plate further comprises a cavity contained therein, a cooling fluid inlet and a cooling fluid outlet.

18. A cold trap for collecting unwanted reactants and particles in an exhaust gas according to claim 14, wherein said cooling plate further comprises a plurality of cooling fins positioned between about 0.2 cm and about 2 cm apart.

19. A cold trap for collecting unwanted reactants and particles in an exhaust gas according to claim 14, wherein said cooling plate further comprises a plurality of cooling fins positioned preferably between about 0.5 cm and about 1.5 cm apart.

20. A cold trap for collecting unwanted reactants and particles in an exhaust gas according to claim 14, wherein said cooling plate further comprises a plurality of cooling fins positioned preferably about 1 cm apart.

\* \* \* \* \*